United States Patent
Yamaguchi et al.

(10) Patent No.: US 9,620,782 B2
(45) Date of Patent: Apr. 11, 2017

(54) NON-AQUEOUS ELECTROLYTE SECONDARY BATTERY

(71) Applicant: NISSAN MOTOR CO., LTD., Yokohama-shi, Kanagawa (JP)

(72) Inventors: Ryuuta Yamaguchi, Yokohama (JP); Takashi Honda, Yokohama (JP); Kosuke Hagiyama, Yokohama (JP); Hiroshi Ogawa, Yokohama (JP); Takeshi Miyamoto, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/779,630

(22) PCT Filed: Mar. 26, 2014

(86) PCT No.: PCT/JP2014/058682
§ 371 (c)(1),
(2) Date: Sep. 24, 2015

(87) PCT Pub. No.: WO2014/157415
PCT Pub. Date: Oct. 2, 2014

(65) Prior Publication Data
US 2016/0056470 A1    Feb. 25, 2016

(30) Foreign Application Priority Data
Mar. 26, 2013    (JP) .................... 2013-064390

(51) Int. Cl.
*H01M 4/62*    (2006.01)
*H01M 4/13*    (2010.01)
(Continued)

(52) U.S. Cl.
CPC ............. *H01M 4/622* (2013.01); *H01M 4/13* (2013.01); *H01M 4/621* (2013.01);
(Continued)

(58) Field of Classification Search
CPC ........... H01M 10/052; H01M 10/0566; H01M 10/0585; H01M 2004/021; H01M 4/13; H01M 4/621; H01M 4/622
See application file for complete search history.

(56) References Cited

U.S. PATENT DOCUMENTS

2002/0006548 A1* 1/2002 Tsutsue ................ H01M 4/131
429/217
2002/0160256 A1  10/2002 Kami et al.
(Continued)

FOREIGN PATENT DOCUMENTS

EP          1083618 A1    3/2001
JP       2002141062 A     5/2002
(Continued)

*Primary Examiner* — Carlos Barcena
(74) *Attorney, Agent, or Firm* — Young Basile Hanlon & MacFarlane, P.C.

(57) ABSTRACT

Wettability of positive and negative electrode active material layers is improved by having the ratio of the liquid absorption speed of an electrolyte to the positive and negative electrode active material layers in an appropriate range when an aqueous binder is used in the negative electrode active material layer. The non-aqueous electrolyte secondary battery has a power generating element having a positive electrode active material layer on a surface of a positive electrode current collector, a negative electrode active material layer containing an aqueous binder on a surface of a negative electrode current collector, and a separator, and Tc/Ta is in the range of 0.6 to 1.3 when Tc is the soak-in time of the electrolyte liquid into the positive electrode active material layer and Ta is the soak-in time of the electrolyte liquid into the negative electrode active material layer.

10 Claims, 2 Drawing Sheets

(51) Int. Cl.
*H01M 10/052* (2010.01)
*H01M 10/0566* (2010.01)
*H01M 10/0585* (2010.01)
*H01M 4/02* (2006.01)

(52) U.S. Cl.
CPC ..... *H01M 10/052* (2013.01); *H01M 10/0566* (2013.01); *H01M 10/0585* (2013.01); *H01M 2004/021* (2013.01); *Y02T 10/7011* (2013.01)

(56) References Cited

U.S. PATENT DOCUMENTS

| | | | |
|---|---|---|---|
| 2003/0118912 A1* | 6/2003 | Watanabe | H01M 10/052 429/326 |
| 2004/0106038 A1* | 6/2004 | Shimamura | H01M 2/021 429/152 |
| 2008/0318130 A1 | 12/2008 | Ogawa et al. | |
| 2010/0015514 A1 | 1/2010 | Miyagi et al. | |
| 2013/0022861 A1 | 1/2013 | Miyagi et al. | |
| 2014/0178732 A1 | 6/2014 | Mizawa et al. | |
| 2014/0342225 A1 | 11/2014 | Isshiki et al. | |

FOREIGN PATENT DOCUMENTS

| | | |
|---|---|---|
| JP | 2003123765 A | 4/2003 |
| JP | 2003331825 A | 11/2003 |
| JP | 2007227368 A | 9/2007 |
| JP | 2009004139 A | 1/2009 |
| JP | 2011023221 A | 2/2011 |
| JP | 2011082101 A | 4/2011 |
| JP | 2011192561 A | 9/2011 |
| JP | 2013020735 A | 1/2013 |
| JP | 2013020772 A | 1/2013 |
| WO | 2013031226 A1 | 3/2013 |
| WO | 2013039131 A1 | 3/2013 |

* cited by examiner

NON-AQUEOUS ELECTROLYTE SECONDARY BATTERY

CROSS REFERENCE TO RELATED APPLICATION

The present application claims priority to Japanese Patent Application No. 2013-064390, filed Mar. 26, 2013, incorporated herein in its entirety.

TECHNICAL FIELD

The present invention relates to a non-aqueous electrolyte secondary battery.

BACKGROUND

In recent years, developments of electric vehicles (EV), hybrid electric vehicles (HEV) and fuel cell vehicles (FCV) have been advanced against the background of escalating environmental protection movement. For a power source for driving motors used on those vehicles, a rechargeable secondary battery is suitable. In particular, what is attracting the attention is a non-aqueous electrolyte secondary battery such as a lithium-ion secondary battery expected to provide high capacity and high output.

A non-aqueous electrolyte secondary battery is provided to have a positive electrode active material layer that is formed on a surface of a current collector and includes a positive electrode active material (for example, $LiCoO_2$, $LiMO_2$, or $LiNiO_2$). Additionally, the non-aqueous electrolyte secondary battery is provided to have a negative electrode active material layer that is formed on a surface of a current collector and includes a negative electrode active material (for example, metal lithium, carbonaceous materials such as cokes, natural and synthetic graphite, metal materials including Sn and Si and oxides of them).

A binder for binding an active material which is used for an active material layer is classified into an organic solvent-based binder (binder which is not dissolved/dispersed in water but dissolved/dispersed in an organic solvent) and an aqueous binder (a binder which is dissolved/dispersed in water). The organic solvent-based binder can be industrially disadvantageous due to high cost such as raw material cost for an organic solvent, recovery cost, and cost relating to waste processing. Meanwhile, the aqueous binder has an advantage of lowering a burden on environment and greatly suppressing an investment on facilities of a production line, since water as a raw material is conveniently available and only water vapor is generated during drying. The aqueous binder also has an advantage that, since the aqueous binder has a high binding effect even with a small amount compared to an organic solvent-based binder, it can increase a ratio of an active material per same volume so that a negative electrode with high capacity can be achieved.

From the viewpoint of having those advantages, various attempts have been made for forming a negative electrode by using an aqueous binder as a binder for forming an active material layer. For example, with regard to a technique of using sulfonated latex as a binder for a negative electrode active material layer, a technique of using a rubber-based binder such as styrene-butadiene rubber (SBR) as a sulfonated latex is disclosed in JP 2003-123765 A. According to JP 2003-123765 A, it is described that the charge characteristics of a battery at low temperature or charge and discharge cycle service life characteristics can be improved by having such constitution.

However, according to the studies by the inventors of the present invention, it was found that the battery performances (in particular, service life characteristics after long-term cycle) of a non-aqueous electrolyte secondary battery in which an aqueous binder such as SBR was used for forming a negative electrode active material layer was still insufficient. The inventors of the present invention found that it was due to the depletion of a liquid in the negative electrode active material layer containing an aqueous binder as caused by poor wettability of an electrolyte liquid, and as described in JP 2003-123765 A, the wettability could be improved by sulfonating the latex. However, it was found that, even when the wettability of the electrode active material layer of only the negative electrode active material layer was improved, a poor soaking property of an electrolyte liquid into a positive electrode active material layer caused insufficient cycle characteristics of a battery.

SUMMARY

Under the circumstances, an object of the present invention is to provide a means capable of maintaining battery characteristics by having improved wettability of positive and negative electrode active material layers as the ratio of the liquid absorption (soaking) speed of an electrolyte liquid to the positive and negative electrode active material layers is set in an appropriate range when an aqueous binder is used in a negative electrode active material layer of a non-aqueous electrolyte secondary battery.

The non-aqueous electrolyte secondary battery of the present invention has a constitution that the power generating element is enclosed within an outer casing. Further, the power generating element has a positive electrode obtained by forming a positive electrode active material layer on a surface of a positive electrode current collector, a negative electrode obtained by forming a negative electrode active material layer on a surface of a negative electrode current collector, and a separator for maintaining an electrolyte liquid. Furthermore, it is characterized in that the negative electrode active material layer contains an aqueous binder and Tc/Ta is in the range of 0.6 to 1.3 when Tc is the soak-in time of the electrolyte liquid into the positive electrode active material layer and Ta is the soak-in time of the electrolyte liquid into the negative electrode active material layer.

DETAILED DESCRIPTION OF THE EMBODIMENTS

The embodiment of the present invention is a non-aqueous electrolyte secondary battery having a power generating element enclosed within an outer casing. Further, the power generating element has a positive electrode obtained by forming a positive electrode active material layer on a surface of a positive electrode current collector, a negative electrode obtained by forming a negative electrode active material layer containing an aqueous binder on a surface of a negative electrode current collector, and a separator for maintaining an electrolyte liquid. Furthermore, provided is a non-aqueous electrolyte secondary battery which is characterized in that Tc/Ta is in the range of 0.6 to 1.3 when Tc is the soak-in time of the electrolyte liquid into the positive electrode active material layer and Ta is the soak-in time of the electrolyte liquid into the negative electrode active material layer.

As the embodiment has the above constitution, the ratio of the liquid absorption (soaking) speed of an electrolyte liquid to the positive electrode active material layer and negative electrode active material layer is in an appropriate range when an aqueous binder is used in a negative electrode active material layer. The wettability of the positive electrode active material layer and negative electrode active material layer is improved so that the battery characteristics (long-term cycle characteristics of battery) can be improved.

The non-aqueous electrolyte secondary battery used for an automobile is exposed to vibration at higher strength than a battery for a household use. It is required to have a battery with vibration resistance and also high capacity to have long cruising distance. Since water can be used as a solvent for producing an active material layer, the aqueous binder has various advantages and, due to high binding property for binding an active material, it is expected to be suitably used for an automobile. However, in the case where an aqueous binder is used for a negative electrode active material layer, due to the poor wettability of a negative electrode active material layer, when the liquid absorption speed is extremely fast in a positive electrode active material layer, the electrolyte liquid is sucked into a positive electrode side. In other words, as the electrolyte liquid is localized on the positive electrode side so that the electrolyte liquid is insufficient in a negative electrode active material layer as counter electrode, thus suppressing suitable impregnation on the negative electrode side. When it is developed into the initial charge step as a next step while the impregnation does not fully progress, film forming on an active material is not evenly performed. Namely, there is a difference in a film forming reaction between a surface on which the impregnation has progressed and a surface on which it has not progressed (unevenness is caused on a surface). It was found in this regard that poor battery performances such as high battery resistance or poor retention rate after long-term cycle was yielded. Based on this finding, when a binder amount, electrode thickness (electrode density), or average particle size of an active material, or the like is adjusted to have the liquid absorption speed ratio in a suitable range between the positive electrode active material layer and negative electrode active material layer, the electrolyte liquid can be more easily distributed to both active material layers of a positive electrode active material layer and a negative electrode active material layer during a liquid injection step as a part of the process for battery fabrication. Accordingly, suitable impregnation can be obtained in an active material layer of the both electrodes. Thus, by having suitable impregnation, when the initial charge step is carried out, the film forming can be evenly performed on a surface of an active material so that it is not likely to have a difference in film forming reaction on an electrode surface. As a result, it was found that sufficient battery performances like suppressed battery resistance, maintaining and improving the retention rate even after a long-term cycle, and the like could be exhibited.

As a result of conducting intensive studies based on the above finding, the inventors of the present invention found that, in the case where an aqueous binder was used for a negative electrode active material layer, Tc/Ta was adjusted to the range of 0.6 to 1.3 when Tc was the soak-in time of the electrolyte liquid into the positive electrode active material layer and Ta was the soak-in time of the electrolyte liquid into the negative electrode active material layer, thereby the electrolyte liquid could be more easily distributed to both of a positive electrode active material layer and a negative electrode active material layer as described above to yield effective liquid absorption and impregnation. The present invention was completed accordingly.

Next, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the description, and are different from actual ratios in some cases.

Figure 1:
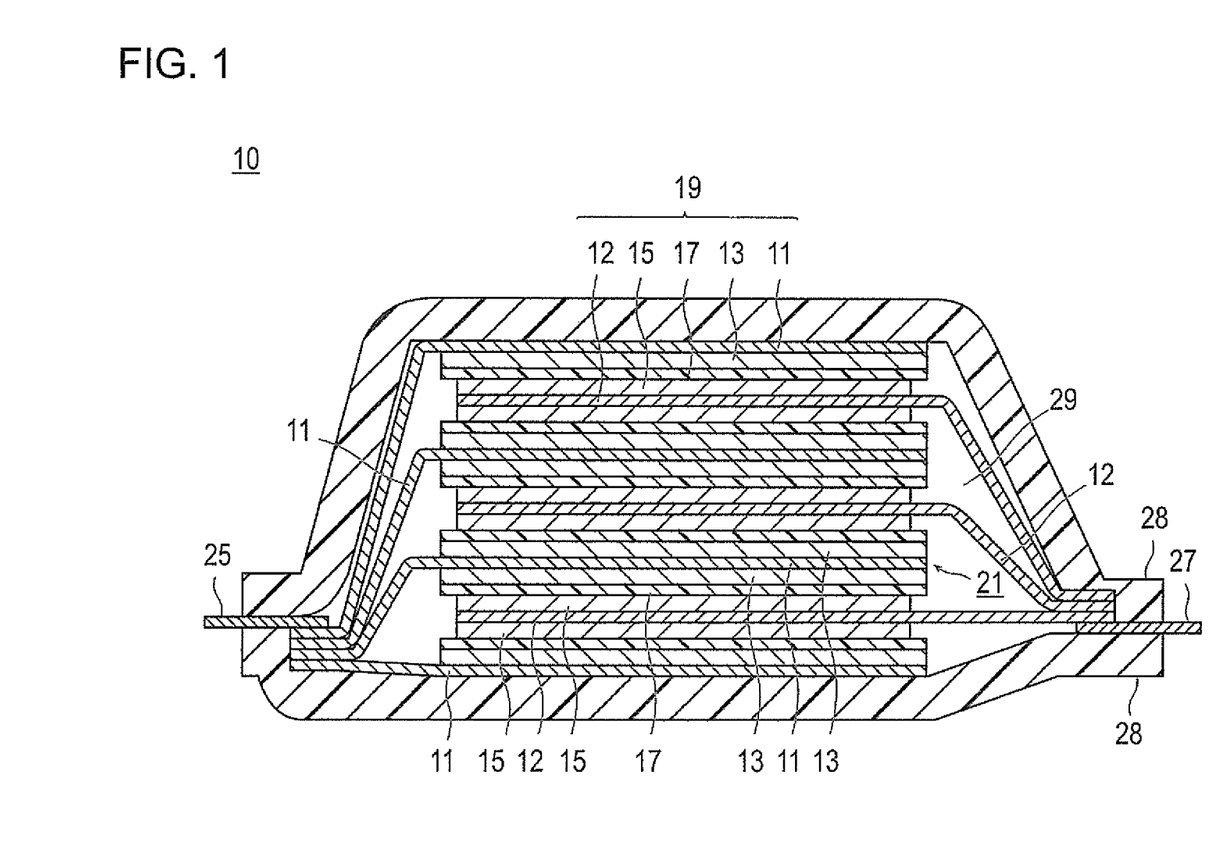
FIG. 1 is a cross-sectional view schematically illustrating the basic constitution of a non-aqueous electrolyte lithium ion secondary battery as one embodiment of an electric device, in which the non-aqueous electrolyte lithium ion secondary battery is a flat type (stack type) and not a bipolar type.

FIG. 1 is a cross-sectional view schematically illustrating the basic constitution of a non-aqueous electrolyte lithium ion secondary battery which is a flat type (stack type) and not a bipolar type (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a battery outer casing 29. Herein, the power generating element 21 has a constitution in which a positive electrode, the separator 17, and a negative electrode are stacked. Meanwhile, the separator 17 has a non-aqueous electrolyte (for example, liquid electrolyte) therein. The positive electrode has a structure in which the positive electrode active material layer 13 is disposed on both surfaces of the positive electrode current collector 11. The negative electrode has a structure in which the negative electrode active material layer 15 is disposed on both surfaces of the negative electrode current collector 12. Specifically, one positive electrode active material layer 13 and the neighboring negative electrode active material layer 15 are disposed to face each other via the separator 17, and the negative electrode, the electrolyte layer, and the positive electrode are stacked in this order. Accordingly, the neighboring positive electrode, electrolyte layer and negative electrode form one single battery layer 19. It can be also said that, as plural single barrier layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the positive electrode active material layer 13 is disposed only on a single surface. However, an active material layer may be formed on both surfaces. Namely, not only a current collector exclusive for an outermost layer in which an active material layer is formed on a single surface can be achieved but also a current collector having an active material layer on both surfaces can be directly used as a current collector of an outermost layer. Furthermore, by reversing the arrangement of the positive electrode and negative electrode of FIG. 1, it is also possible that the outer most layer negative electrode current collector is disposed on both outermost layers of the power generating element 21 and a negative electrode active material layer is disposed on a single surface or both surfaces of the same outermost layer negative electrode current collector.

The positive electrode current collector 11 and negative electrode current collector 12 have a structure in which each of the positive electrode current collecting plate (tab) 25 and negative electrode current collecting plate (tab) 27, which conductively communicate with each electrode (positive electrode and negative electrode), is attached and inserted to the end part of the battery outer casing 29 so as to be led to the outside of the battery outer casing 29. If necessary, each of the positive electrode current collecting plate 25 and negative electrode current collecting plate 27 can be attached, via a positive electrode lead and negative electrode lead (not illustrated), to the positive electrode current collector 11 and negative electrode current collector 12 of each electrode by ultrasonic welding or resistance welding.

Meanwhile, although a stack type battery which is a flat type (stack type), not a bipolar type is illustrated in FIG. 1, it can be also a bipolar type battery containing a bipolar type electrode which has a positive electrode active material layer electrically bound to one surface of a current collector and a negative electrode active material layer electrically bound to the opposite surface of the current collector. In that case, one current collector plays both roles of a positive electrode current collector and a negative electrode current collector.

Hereinbelow, each member is described in more detail.

[Negative electrode active material layer] The negative electrode active material layer contains a negative electrode active material. Examples of the negative electrode active material include a carbon material such as graphite (natural graphite and artificial graphite), soft carbon, and hard carbon, a lithium-transition metal composite oxide (for example, $Li_4Ti_5O_{12}$), a metal material, and a lithium alloy-based negative electrode active material. If necessary, two or more kinds of a negative electrode active material may be used in combination. Preferably, from the viewpoint of capacity and output characteristics, a carbon material or a lithium-transition metal composite oxide is used as a negative electrode active material. Meanwhile, it is needless to say that a negative electrode active material other than those described above can be also used.

The average particle size of each active material contained in the negative electrode active material layer is, although not particularly limited, preferably 1 to 100 μm, and more preferably 1 to 30 μm from the viewpoint of having high output.

The negative electrode active material layer includes at least an aqueous binder. Meanwhile, the aqueous binder has an advantage of lowering a burden on environment and greatly suppressing an investment on facilities of a production line, since water as a raw material is conveniently available and only water vapor is generated during drying. Further, as it has a high binding property for binding an active material, the mass ratio of a binder in the negative electrode active material layer can be reduced, and accordingly the mass ratio of the active material can be increased as much as the reduced amount.

The aqueous binder indicates a binder with which water is used as a solvent or a dispersion medium, and specific examples thereof include a thermoplastic resin, a polymer with rubber elasticity, a water soluble polymer, and a mixture thereof. Herein, the binder with which water is used as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate(methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, ethylene-propylene copolymer, polybutadiene, butyl rubber, fluororubber, polyethylene oxide, polyepichlorohydrin, polyphosphagen, polyacrylonitrile, polystyrene, ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4,000, and more preferably 1,000 to 3,000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch, and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, copolymer of (meth)acrylamide and/or (meth)acrylic acid salt [(meth)acrylamide polymer, (meth)acrylamide-(meth)acrylic acid salt copolymer, alkyl(meth)acrylic acid (carbon atom number of 1 to 4) ester-(meth)acrylic acid salt copolymer, or the like], styrene-maleic acid salt copolymer, mannich modified product of polyacrylamide, formalin condensation type resin (urea-formalin resin, melamin-formalin resin or the like), polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder which is selected from the group consisting of styrene-butadiene rubber, acrylonitrile-butadiene rubber, methacrylic acid methyl-butadiene rubber, and methacrylic acid methyl rubber. Further, from the viewpoint of having a good binding property, the aqueous binder preferably contains styrene-butadiene rubber (SBR). According to this embodiment, even when a negative electrode using a binder containing SBR, with which impregnation of an electrolyte liquid does not easily occur in spite of an excellent binding property, is used, the impregnation suitably progresses as the liquid absorption speed ratio between the positive electrode active material layer and the negative electrode active material layer described above is set in a suitable range (the range of Tc/Ta=0.6 to 1.3). Accordingly, the film forming can be evenly performed during the initial charge step, and thus it is particularly excellent in that sufficient battery characteristics like suppressed battery resistance, maintaining and improving the retention rate even after a long-term cycle, and the like can be exhibited.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose (CMC), methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose are preferably combined as a binder. The mass content ratio between the styrene-butadiene rubber and a water soluble polymer is, although not particularly limited, preferably as follows: styrene-butadiene rubber:water soluble polymer=1:0.2 to 2, and more preferably 1:0.5 to 1. The water soluble polymer may be classified as a thickening agent, separately from an aqueous binder. In such case, the mixing ratio between the styrene-butadiene rubber:water soluble polymer can be interpreted as a mixing ratio between an aqueous binder and a thickening agent.

When the water soluble polymer is classified as a thickening agent, the weight average molecular weight of the water soluble polymer (CMC or the like) is preferably in the range of 5,000 to 1,200,000, more preferably 6,000 to 1,100,000, and even more preferably 7,000 to 1,000,000. When the weight average molecular weight of the water soluble polymer is 5,000 or more, viscosity of an aqueous slurry can be maintained at suitable level when a thickening agent is dissolved in water, like having suitable viscosity of an aqueous slurry. It is thus advantageous in that it can be effectively used as a thickening agent during the step of producing a negative electrode. When the weight average molecular weight of the water soluble polymer is 1,200,000 or less, viscosity of an aqueous slurry can be suitably maintained without having a gel state when the thickening agent is dissolved in a water-based solvent like water. Thus, it is advantageous in that it can be effectively used as a thickening agent during a step for producing a negative electrode. As a method for measuring the weight average molecular weight of a water soluble polymer, the molecular weight distribution of a water soluble polymer can be measured by using gel permeation chromatography in which a solvent containing a metal-amine complex and/or a metal-alkali complex is used as a mobile phase solvent. Based on the molecular weight distribution, the molecular weight of the weight average molecular weight of a water soluble polymer can be calculated. Meanwhile, the method for measuring the weight average molecular weight of a water soluble polymer is not limited to the above method, and it can be measured and calculated by a method well known in the art.

When the water soluble polymer is classified as a thickening agent, the content of the water soluble polymer is, relative to the total amount of a negative electrode active material layer, in the range of 0.1 to 10% by mass, and preferably 0.5 to 2% by mass. When the content of a water soluble polymer is 0.1% by mass or more, the thickening effect is sufficiently exhibited during the process of producing a negative electrode so that a negative electrode active material layer with smooth and even surface can be provided. Furthermore, it is possible to provide a negative electrode which is excellent in terms of gas generation during initial charge of an obtained negative electrode and also capacity obtained by improved charge and discharge efficiency. Furthermore, when it is 10% by mass or less, viscosity of an aqueous slurry can be suitably adjusted based on the excellent thickening effect, and thus a desired negative electrode active material layer can be obtained. Furthermore, it is possible to provide a negative electrode which is excellent in terms of capacity due to improvement of charge and discharge efficiency and also gas generation during initial charge of an obtained negative electrode.

In the binder used for the negative electrode active material layer, content of the aqueous binder is preferably 80 to 100% by mass, more preferably 90 to 100% by mass, and even more preferably 100% by mass. As a binder other than an aqueous binder, a binder (organic solvent-based binder) used in the following positive electrode active material layer can be mentioned.

The binder amount contained in the negative electrode active material layer is not particularly limited, as long as the binder can bind the active material. Preferably, it is 0.5 to 15% by mass, more preferably 1 to 10% by mass, and more preferably 2 to 5% by mass relative to the negative electrode active material layer.

Furthermore, because of a high binding power, the aqueous binder can form negative electrode active material layer, even with addition of a small amount compared to an organic solvent-based binder. Accordingly, the content of an aqueous binder contained in the negative electrode active material layer is, relative to the negative electrode active material layer, preferably 0.5 to 15% by mass, more preferably 1 to 10% by mass, and even more preferably 2 to 5% by mass. When the content of the aqueous binder contained in the negative electrode active material layer is within the above range, a suitable amount of the aqueous binder can be present on an interface with the current collector. It is particularly excellent in that it becomes possible to have a friction coefficient which is in the range described above, and optimum adhesiveness, peeling-resistance, and vibration resistance can be exhibited without causing disruption in aggregation when the active material layer is distorted due to the vibration applied from an outside.

Furthermore, although a binder like hydrophilic PVdF (organic solvent-based binder) can cause increased liquid absorption speed as the content of the binder increases, it is disadvantageous in terms of energy density. Furthermore, an excessively high binder amount yields increased battery resistance. When the amount of an aqueous binder contained in the negative electrode active material layer is in the aforementioned range, the active material can be effectively bound, and the effect of the present invention can be further enhanced. Namely, it is possible to have homogeneous film forming and high energy density, and improve further the good cycle characteristics.

If necessary, the negative electrode active material layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active material layer or negative electrode active material layer. As the conductive aid, for example, there can be mentioned carbon black including acetylene black; graphite; and carbon materials such as carbon fiber. When the active material layer contains a conductive aid, an electron network is formed effectively in the inside of the active material layer, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the negative electrode active material layer and positive electrode active material layer described below is not particularly limited. The blending ratio can be adjusted by suitably referring the already-known knowledge about a lithium ion secondary battery. The thickness of each active material layer is not particularly limited either, and reference can be made to the already-known knowledge about a battery. For example, the thickness of each active material layer is about 2 to 100 μm.

In the present invention, the density of the negative electrode active material layer is preferably 1.2 to 1.8 $g/cm^3$. Herein, when an aqueous binder is used for the negative electrode active material layer, there is generally a phenomenon of having a large amount of gas generated during initial charge of a battery, compared to a solvent-based binder such as PVdF which is frequently used in a related art. In this regard, when the density of a negative electrode active material layer is 1.8 $g/cm^3$ or less, the generated gas can be sufficiently released from the inside of a power generating element so that the long-term cycle characteristics can be further improved. In addition, when the density of a negative electrode active material layer is 1.2 $g/cm^3$ or more, the connectivity of an active material is ensured to fully maintain the electron conductivity, and as a result, the battery performance can be further enhanced. In addition, as the density of the negative electrode active material layer is within the aforementioned range, it is possible to provide a battery which has homogeneous film forming and high energy density, and good cycle characteristics. It is more preferable that the liquid absorption speed ratio between the positive electrode active material layer and the negative electrode active material layer is within a suitable range (in the aforementioned range of Tc/Ta=0.6 to 1.3) and the density of the negative electrode active material layer is also within the above range. It is excellent in that the above effect can be further enhanced accordingly. The density of the negative electrode active material layer is, from the viewpoint of further exhibiting the effect of the present invention, preferably 1.4 to 1.6 $g/cm^3$. Meanwhile, the density of the negative electrode active material layer means mass of an active material layer per unit volume. Specifically, after collecting the negative electrode active material layer from a battery and removing the solvent or the like which is present in the electrolyte liquid, the electrode volume is obtained from width, length, and height, weight of the active material layer is measured, and the weight is divided by volume to obtain the density.

Furthermore, in the present invention, it is preferable that the average center line roughness (Ra) on a separator-side surface of the negative electrode active material layer is 0.5 to 1.0 μm. When the negative electrode active material layer has average center line roughness (Ra) of 0.5 μm or more, the long-term cycle characteristics can be further improved. It is believed to be due to the reason that, when the surface roughness is 0.5 μm or more, the gas generated within the power generating element can be easily released to outside of the system. Furthermore, when the average center line roughness (Ra) of the negative electrode active material layer is 1.0 μm or less, the electron conductivity in a battery element can be obtained at sufficient level so that the battery characteristics can be further improved.

As described herein, the average center line roughness Ra is a value expressed in micrometer (μm) which is obtained by the following Formula 1 (JIS-B0601-1994), when only the reference length in the direction of average line is subtracted from a roughness curve, x axis is taken in the direction of the average line in the subtracted part, y axis is taken in the direction of vertical magnification, and the roughness curve is expressed as y=f(x).

$$Ra = \frac{1}{\ell} \int_0^\ell |f(x)| dx \qquad \text{[Formula 1]}$$

Ra value can be measured by using a probe type or a non-contact type surface roughness measurement device that is widely used in general, based on the method described in JIS-B0601-1994 or the like. There is no limitation regarding a manufacturer or mode of the apparatus. For the determination in the present invention, Model No. LEXT-OLS3000 made by Olympus Corporation was used, and with a device for analyzing the roughness (which is attached to the apparatus), Ra was obtained based on the method prescribed in JIS-B0601. Although the measurement can be made by any one of the contact type (probe type using a diamond needle or the like) and non-contact type (non-contact detection using laser beam or the like), the measurement was made in the present invention according to the contact type method.

Furthermore, as it can be measured relatively easily, the surface roughness Ra defined in the present invention is measured at a stage in which an active material layer is formed on a current collector during the manufacturing process. However, the measurement can be made even after the completion of a battery, and as it gives almost the same result as that obtained during the production process, it is sufficient that the surface roughness after completion of the battery satisfies the above Ra range. In addition, the surface roughness of a negative electrode active material layer indicates the roughness on a separator side of the negative electrode active material layer.

The surface roughness of a negative electrode can be controlled to be within the aforementioned range by adjusting, for example, the press pressure for forming an active material layer while considering the shape and particle size of an active material which is included in the negative electrode active material layer, and blending amount of an active material or the like. The shape of the active material varies depending on the type or production method, or the like. The shape control can be made by crushing or the like. Examples of the shape include a spherical (powder) shape, a plate shape, a needle shape, a column shape, and a prism shape. Thus, considering the shape employed for an active material layer, various active materials can be combined to control the surface roughness.

Furthermore, the porosity of the negative electrode active material layer is 25 to 40%, preferably 30 to 35%, and more preferably 32 to 33%. When the porosity of an active material layer is increased, the liquid absorption speed increases, but it is disadvantageous in terms of energy density. Furthermore, there is a possibility that the cycle service life is affected by excessively high porosity of the active material layer. It is preferable that the liquid absorption speed ratio between the positive electrode active material layer and the negative electrode active material layer is in a suitable range (in the range of Tc/Ta=0.6 to 1.3) and the porosity of the positive electrode active material layer is suitably adjusted (20 to 30%), or the porosity of the negative electrode active material layer is suitably adjusted (25 to 40%). Accordingly, even surface film forming is obtained during initial charge step and a battery with excellent energy density and cycle characteristics can be obtained. It is more preferable that the liquid absorption speed ratio between the positive electrode active material layer and the negative electrode active material layer is in a suitable range (in the range of Tc/Ta=0.6 to 1.3) and the porosity of each of the positive electrode active material layer and the negative electrode active material layer is suitably adjusted to the above range. It is excellent from the viewpoint of increasing further the above effect. Meanwhile, as for the porosity of an active material layer, a value obtained as a volume ratio from the density of a raw material of an active material layer and the density of an active material layer as a final product is used. For example, when the density of a raw material is ρ and volume density of an active material layer is ρ', it is described as follows: porosity of active material layer=100× (1−ρ'/ρ).

[Positive electrode active material layer] The positive electrode active material layer contains an active material, and if necessary, it further contains other additives such as a conductive aid, a binder, an electrolyte (for example, polymer matrix, ion conductive polymer, and electrolyte liquid), and lithium salt for enhancing ion conductivity.

The positive electrode active material layer contains a positive electrode active material. Examples of the positive electrode active material include a lithium-transition metal composite oxide such as $LiMn_2O_4$, $LiCoO_2$, $LiNiO_2$, $Li(Ni-Mn-Co)O_2$, a lithium-transition metal phosphate compound, and a lithium-transition metal sulfate compound, or a compound in which part of the transition metals is replaced with other element. Depending on the case, two or more kinds of a positive electrode active material can be used in combination. As a preferred example, a lithium-transition metal composite oxide is used as a positive electrode active material from the viewpoint of capacity and output characteristics. As a more preferred example, $Li(Ni-Mn-Co)O_2$ and a compound in which part of the transition metals is replaced with other element (hereinbelow, also simply referred to as the "NMC composite oxide") are used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is two times higher, it can have high capacity.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \le a \le 1.2$, $0<b<1$, $0<c\le0.5$, $0<d\le0.5$, $0\le x\le0.3$, and b+c+d=1. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \le b \le 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0<x\le0.3$ in General Formula (1), in particular. By dissolving at least one selected from the group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

As a more preferred embodiment, b, c, and d in General Formula (1) satisfy $0.44 \le b \le 0.51$, $0.27 \le c \le 0.31$, and $0.19 \le d \le 0.26$ from the viewpoint of having excellent balance between capacity and durability.

Meanwhile, it is needless to say that a positive electrode active material other than those described above can be also used.

The average particle size of each active material which is contained in the positive electrode active material layer is, although not particularly limited, preferably 1 to 100 and more preferably 1 to 20 μm from the viewpoint of having high output.

A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene fluorine-based fluorine rubber (VDF-CTFE-based fluorine rubber), an epoxy resin, and the like. These binders may be each used singly, or two or more thereof may be used in combination.

The amount of the binder contained in the positive electrode active material layer is not particularly limited as long as the binder can bind the active material. However, the amount of binder is preferably 0.5 to 15% by mass, more preferably 1 to 10% by mass, and still more preferably 2 to 6% by mass with respect to the positive electrode active material layer. Although a binder such as hydrophilic PVdF (organic solvent-based binder) can cause increased liquid absorption speed as the content of the binder increases, it is disadvantageous in terms of energy density. Furthermore, an excessively large binder amount yields increased battery resistance. When the amount of a binder contained in the positive electrode active material layer is in the aforementioned range, the active material can be effectively bound, and the effect of the present invention can be further enhanced.

With regard to other additives other than the binder, those described for the above negative electrode active material layer can be also used.

Furthermore, the porosity of the positive electrode active material layer is 20 to 30%, preferably 22 to 28%, and more preferably 23 to 25%. When the porosity of an active material layer is increased, the liquid absorption speed increases, but it is disadvantageous in terms of energy density. Furthermore, there is a possibility that the cycle service life is affected by excessively high porosity of the active material layer. It is preferable that the liquid absorption speed ratio between the positive electrode active material layer and the negative electrode active material layer is in a suitable range (in the range of Tc/Ta=0.6 to 1.3) and the porosity of the positive electrode active material layer is suitably adjusted (20 to 30%), or the porosity of the negative electrode active material layer is suitably adjusted (25 to 40%). Accordingly, even surface film forming is obtained during initial charge step and a battery with excellent energy density and cycle characteristics can be obtained. It is more preferable that the liquid absorption speed ratio between the positive electrode active material layer and the negative electrode active material layer is in a suitable range (in the range of Tc/Ta=0.6 to 1.3) and the porosity of each of the positive electrode active material layer and the negative electrode active material layer is suitably adjusted to the above range. It is excellent from the viewpoint of increasing further the above effect.

[Separator (Electrolyte Layer)] A separator has an activity of maintaining an electrolyte to ensure lithium ion conductivity between a positive electrode and a negative electrode and also a function of a partition wall between a positive electrode and negative electrode.

Herein, in order to improve further the property of releasing the gas generated during initial charge of battery from the power generating element, it is also preferable to consider the property of releasing the gas which reaches the separator after discharged from the negative electrode active material layer. From this point of view, it is more preferable that the air permeability or porosity of the separator is adjusted to a suitable range.

Specifically, the air permeability (Gurley value) of the separator is preferably 200 (second/100 cc) or less. As the air permeability (Gurley value) of the separator is preferably 200 (second/100 cc) or less, the release of the generated gas is improved so that the battery can have good capacity retention rate after cycles and can have sufficient short-circuit preventing property and also sufficient mechanical properties as a function of the separator. Although the lower limit of the air permeability is not particularly limited, it is generally 50 (second/100 cc) or more. The air permeability of the separator is a value measured by the method of JIS P8117 (2009).

Furthermore, the porosity of the separator is 40 to 65%, preferably 45 to 60%, and more preferably 50 to 58%. As the porosity of the separator is 40 to 65%, the releasing property of the generated gas is improved so that the battery can have good long-term cycle characteristics and can have sufficient short-circuit preventing property and also sufficient mechanical properties as a function of the separator. Meanwhile, as for the porosity, a value obtained as a volume ratio from the density of a raw material resin of a separator and the density of a separator as a final product is used. For example, when the density of a raw material resin is $\rho$ and volume density of a separator is $\rho'$, it is described as follows: porosity=$100\times(1-\rho'/\rho)$.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometer).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte.

The porosity of a separator composed of non-woven fabric is 50 to 90%, and preferably 60 to 80%. Furthermore, the thickness of a separator composed of non-woven fabric can be the same as the thickness of an electrolyte layer, and it is preferably 5 to 200 μm and particularly preferably 10 to 100 μm.

Herein, the separator can be a separator having a heat resistant insulating layer laminated on at least one surface of a porous resin substrate (separator composed of microporous membrane or non-woven fabric). The heat resistant insulating layer is a ceramic layer containing inorganic particles and a binder. By having a heat resistant insulating layer, internal stress in a separator which increases under temperature increase is alleviated so that the effect of inhibiting thermal shrinkage can be obtained. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating an electric device. Furthermore, the ceramic layer can also function as a means for releasing gas to improve the property of releasing the gas from the power generating element, and therefor desirable.

Furthermore, in the present invention, the average center line roughness (Ra) on a surface of a negative electrode active material layer side of a separator having a heat resistant insulating layer is 0.1 to 1.2 µm, preferably 0.2 to 1.1 µm and more preferably 0.25 to 0.9 µm. Furthermore, when the average center line roughness (Ra) on a surface of the heat resistant insulating layer of a separator is 0.1 µm or more, in addition to being effective for preventing distortion between the electrode and separator during manufacturing a battery, the long-term cycle characteristics can be further improved. It is believed to be due to the reason that, when the surface roughness is 0.1 µm or more, the gas generated within the power generating element can be easily released to outside of the system. Furthermore, when the average center line roughness (Ra) on a surface of the heat resistant insulating layer of a separator is 1.2 µm or less, local thickness deviation of the separator can be suppressed so that the ion conductivity becomes even in the plane. As a result, the battery characteristics can be further improved. Meanwhile, as the average center line roughness Ra is the same as the average center line roughness (Ra) of the negative electrode active material layer described above, explanations therefor are omitted herein.

As described above, the separator also contains an electrolyte. The electrolyte is not particularly limited as long as it can exhibit those functions, and a liquid electrolyte or a gel polymer electrolyte is used.

The liquid electrolyte has an activity of a lithium ion carrier. The liquid electrolyte has the form in which lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between each layer is blocked. Examples of an ion conductive polymer which is used as a matrix polymer (host polymer) include polyethylene oxide (PEO), polypropylene oxide (PPO), and a copolymer thereof. An electrolyte salt such as lithium salt can be dissolved well in those polyalkylene oxide polymers.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

[Current collector] The material for forming a current collector is not particularly limited, but metal is preferably used.

Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 µm.

[Positive electrode current collecting plate and negative electrode current collecting plate] The material for forming the current collecting plate (25, 27) is not particularly limited, and a known highly conductive material which has been conventionally used for a current collecting plate for a lithium ion secondary battery can be used. Preferred examples of the material for forming a current collecting plate include metal material such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 25 and the negative electrode current collecting plate 27.

[Positive electrode lead and negative electrode lead] Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led out from a casing is preferably coated with a heat resistant and insulating thermally shrunken tube or the like so that it has no influence on a product (for example, an automobile component, in particular, an electronic device or the like) by electric leak after contact with neighboring instruments or wirings.

[Battery outer casing] As for the battery outer casing 29, an envelope-shaped casing to cover a power generating element, in which a laminate film including aluminum is contained, can be used as a member for enclosing a power generating element within it. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and a battery with large size can be provided, a power generating element with laminated structure and a laminate film containing aluminum for an outer casing is more preferred.

The internal volume of the battery outer casing 29 is designed to be larger than the volume of the power generating element 21 such that it can enclose the power generating element 21. Herein, the internal volume of an outer casing indicates the volume inside an outer casing before performing a vacuum treatment after sealing the outer casing. Furthermore, the volume of the power generating element means the volume which is spatially taken by the power generating element, and it include the pore part in the power generating element. As the internal volume of an outer casing is larger than the volume of the power generating element, a space for collecting gas at the time of gas generation can be present. Accordingly, the gas release property from the power generating element is enhanced and it is less likely that the battery behavior is affected by the generated gas, and therefore the battery characteristics are improved.

Furthermore, in this embodiment, it is preferable to have a constitution such that the ratio value ($L/V_1$) of the volume L of the electrolyte liquid injected to the outer casing to the volume $V_1$ of pores present in the power generating element 21 is in the range of 1.2 to 1.6. When the amount of an electrolyte liquid (volume L) is large, a sufficient amount of an electrolyte liquid is present also on the negative electrode side even when an electrolyte liquid is localized on the positive electrode side, for example, and thus it is advantageous from the viewpoint of having even forming of a surface coating film on both electrodes. Meanwhile, if the electrolyte liquid (volume L) is large, the cost will increase due to increased electrolyte liquid, and excessive electrolyte liquid leads to a wider distance between the electrodes, and as a result, the battery resistance is increased. It is preferable that the liquid absorption speed ratio between the positive electrode active material layer and the negative electrode active material layer is within a suitable range (it is in the range that Tc/Ta=0.6 to 1.3) and the electrolyte liquid is used with a suitable amount (in detail, the $L/V_1$ value which is the ratio of the volume L of the electrolyte liquid to the volume $V_1$ of pores present in the power generating element 21). It is excellent in that even film forming, cost, and cell resistance can be achieved. From the point of view, it is preferable that $L/V_1$ value is adjusted to be in the range of 1.2 to 1.6. It is more preferably in the range of 1.25 to 1.55, and particularly preferably 1.3 to 1.5.

Furthermore, in this embodiment, it is preferable to have a constitution such that the ratio value ($V_2/V_1$) of the volume $V_2$ of an extra space (Symbol 31 in FIG. 1) inside the battery outer casing 29 to the volume $V_1$ of the pores present in the power generating element 21 is 0.5 to 1.0. It is also preferable to have a constitution such that the ratio ($L/V_2$) value which is the ratio of the volume L of the electrolyte liquid injected to an outer casing relative to the volume $V_2$ of an extra space inside the outer casing is 0.4 to 0.7. Accordingly, among the electrolyte liquid injected to the inside of an outer casing, the electrolyte liquid not absorbed by the binder can be surely present in the aforementioned extra space. In addition, movement of lithium ions can be surely guaranteed inside the battery. As a result, an occurrence of an uneven reaction accompanied with the increased distance between electrode plates, which is caused by the presence of extra electrolyte liquid as a possible problem when the electrolyte liquid is used in the same large amount as the solvent-based binder such as PVdF, is prevented. Accordingly, a non-aqueous electrolyte secondary battery having excellent long-term cycle characteristics (service life characteristics) can be provided.

Herein, the "pore volume ($V_1$) in the power generating element" can be calculated by adding all pore volume of the positive electrode, negative electrode, and separator. Namely, it can be calculated as total of pores that are present in each member constituting the power generating element. Furthermore, the battery can be manufactured by injecting an electrolyte liquid after enclosing power generating element in an outer casing and then sealing it with creating vacuum inside the outer casing. When gas is generated from the inside of an outer casing in this state, if there is a space for holding the generated gas inside an outer casing, the generated gas is concentrated in that space, yielding a swollen outer casing. In the specification, this space is defined as an "extra space", and the volume of an extra space when the outer casing is swollen at maximum level without burst is defined as $V_2$. As described above, the value of $V_2/V_1$ is preferably 0.5 to 1.0, more preferably 0.6 to 0.9, and particularly preferably 0.7 to 0.8.

Furthermore, as described above, the value between the volume of injected electrolyte liquid and the volume of the aforementioned extra surface is controlled within a predetermined range in the present invention. Specifically, the ratio ($L/V_2$) value which is the ratio of the volume L of the electrolyte liquid injected to an outer casing relative to the volume $V_2$ of an extra space inside the outer casing is preferably controlled to 0.4 to 0.7. $L/V_2$ value is more preferably 0.45 to 0.65, and particularly preferably 0.5 to 0.6.

Meanwhile, in this embodiment, it is preferable that the aforementioned extra space which is present inside the outer casing is disposed at least vertically above the power generating element. By having this constitution, the generated gas can be concentrated at a site vertically above the power generating element in which an extra space is present. Accordingly, compared to a case in which an extra space is present in a lateral part or a bottom part of the power generating element, the electrolyte liquid can be firstly present in a bottom part in which the power generating element is present inside the outer casing. As a result, a state in which the power generating element is constantly soaked in as large amount of electrolyte liquid as possible can be obtained, and thus lowered battery performance accompanied with liquid depletion can be suppressed to a minimum level. Meanwhile, although there is no specific limitation on the constitution to have an extra space present vertically above the power generating element, for example, it is possible that the material or shape of an outer casing itself is constituted such that no swelling occurs toward the lateral part or bottom part of the power generating element, or a member for preventing the swelling of an outer casing toward the lateral part or bottom part can be disposed on the outside of an outer casing.

For an application for an automobile or the like, a battery with large size is required in these days. Furthermore, the effect of the present invention, that is, improving the wettability of a positive electrode active material layer and a negative electrode active material layer, is exhibited more effectively for a large-area battery in which both positive electrode active material layer and negative electrode active material layer have a large electrode area. Furthermore, the effect of preventing uneven forming of a coating film (SEI) on a surface of the negative electrode active material as described above is more effectively exhibited for a large-area battery in which the coating film (SEI) is formed in a large amount on a surface of the negative electrode active material. Furthermore, for a case in which an aqueous binder is used for a negative electrode active material layer, by lowering the friction coefficient between the negative electrode active material layer and the separator compared to a certain value, the effect of suitably lowering the adhesiveness between the electrode and the separator when electrode is not in proper position is more effectively exhibited for a battery with large area. Namely, in case of a battery with large area, the disruption in aggregation is further suppressed in an electrode surface which is caused by a friction between the electrode and separator, and thus it is favorable in that the battery characteristics are maintained even when vibration is applied. Thus, in this embodiment, a battery structure having a power generating element covered with an outer casing preferably has large size from the viewpoint of better exhibition of the effect of the embodiment. Specifically, it is preferable that the negative electrode active material layer has a rectangular shape in which the short side length is 100 mm or more. Such battery with large size can be used for an application in automobile. Herein, the short side length of a negative electrode active material layer indicates the length of the shortest side in each electrode. Herein, the upper limit of a length of a short side is, although not particularly limited, generally 250 mm or less.

It is also possible to determine the large size of a battery in view of a relationship between battery area or battery capacity, from the viewpoint of a large-size battery, which is different from a physical size of an electrode. For example, in the case of a flat and stack type laminate battery, the ratio value of a battery area (projected area of a battery including an outer casing of the battery) to rated capacity is 5 $cm^2/Ah$ or more, and for a battery with rated capacity of 3 Ah or more, the battery area per unit capacity is large so that it is difficult to remove the gas generated between the electrodes. Due to an occurrence of such gas, if a gas retention part is present between large-size electrodes, in particular, an uneven reaction may occur more easily by having that part as a start point. For such reasons, a problem of having lowered battery characteristics (in particular, service life characteristics after long-term cycle) may become more significant for a large-size battery in which an aqueous binder such as SBR is used for forming a negative electrode active material layer. The non-aqueous electrolyte secondary battery according to this embodiment is preferably a large-size battery as described above from the viewpoint of having a larger merit by exhibition of the working effects of the present invention. Furthermore, the aspect ratio of a rectangular electrode is preferably 1 to 3, and more preferably 1 to 2. Meanwhile, the aspect ratio of an electrode is defined by a horizontal to vertical ratio of the positive electrode active material layer with a rectangular shape. By having the aspect ratio in this range, an advantage of further suppressing an occurrence of uneven film can be obtained according to the present invention in which use of an aqueous binder is essential, as the gas can be evenly released in plane direction.

The rated capacity of a battery is obtained as described below.

<<Measurement of rated capacity>> For measurement of rated capacity, a battery for test was injected with an electrolyte solution, allowed to stand for 10 hours or so, and subjected to initial charge. After that, the measurement was carried out according to the following step 1 to 5 at temperature of 25° C., in the voltage range of 3.0 V to 4.15 V.

Step 1: After reaching 4.15 V by constant current charge at 0.2 C, it was rested for 5 minutes.

Step 2: After Step 1, it was charged for 1.5 hours by constant voltage charge followed by resting for 5 minutes.

Step 3: After reaching 3.0 V by constant current discharge at 0.2 C, it was discharged for 2 hours by constant voltage discharge followed by resting for 10 seconds.

Step 4: After reaching 4.1 V by constant current charge at 0.2 C, it was charged for 2.5 hours by constant voltage charge followed by resting for 10 seconds.

Step 5: After reaching 3.0 V by constant current discharge at 0.2 C, it was discharged for 2 hours by constant voltage discharge followed by resting for 10 seconds.

Rated capacity: The discharge capacity (CCCV discharge capacity) from the constant current discharge to constant voltage discharge of Step 5 is used as rated capacity.

[Group pressure applied on power generating element] In the present embodiment, the group pressure applied on the power generating element is preferably 0.07 to 0.7 $kgf/cm^2$ (6.86 to 68.6 kPa). By applying pressure to a power generating element to have the group pressure of 0.07 to 0.7 $kgf/cm^2$, uneven increase in distance between electrode plates can be prevented and it is also possible to ensure sufficient movement of lithium ions between electrode plates. In addition, the gas which is generated according to the battery reaction can be released better to an outside of the system, and also as extra electrolyte liquid in the battery does not much remain between the electrodes, and thus an increase in cell resistance can be suppressed. In addition, as the battery swelling is suppressed, good cell resistance and capacity retention rate after long-term cycle are obtained. More preferably, the group pressure applied to the power generating element is 0.1 to 0.7 $kgf/cm^2$ (9.80 to 68.6 kPa). Herein, the group pressure indicates an external force applied to a power generating element. The group pressure applied to a power generating element can be easily measured by using a film type pressure distribution measurement system. In the present specification, the value measured by using the film type pressure distribution measurement system manufactured by Tekscan is used.

Although it is not particularly limited, control of the group pressure can be made by applying directly or indirectly external force to a power generating element by physical means, and controlling the external force. As for the method for applying external force, it is preferable to use a pressure member which can apply pressure on an outer casing. Namely, one preferred embodiment of the present invention is a non-aqueous electrolyte secondary battery which further has a pressure member for applying pressure on an outer casing such that the group pressure applied on the power generating element is 0.07 to 0.7 $kgf/cm^2$.

Figure 2A:
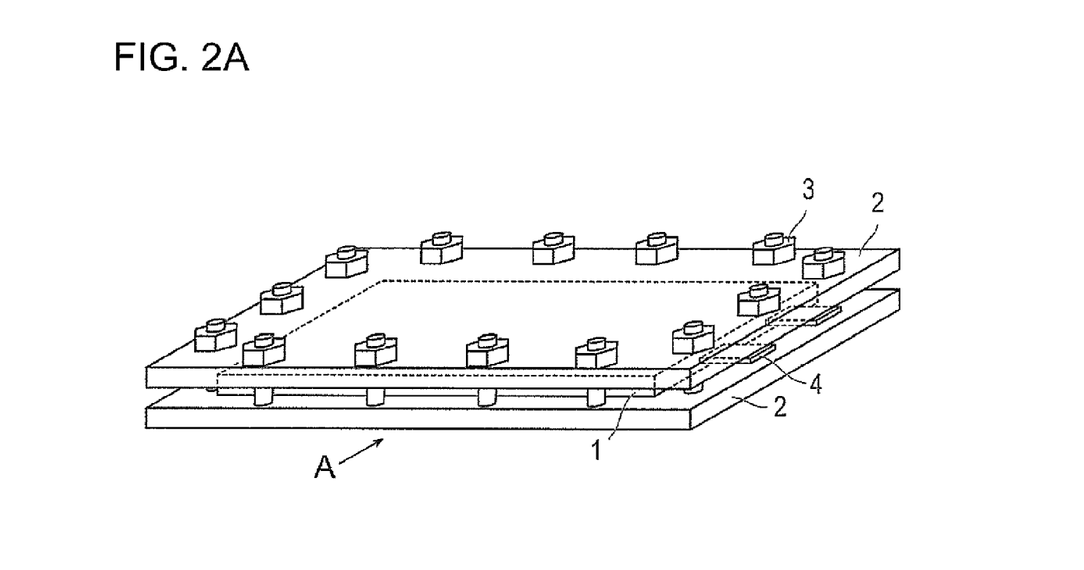
FIG. 2A is a top view of a non-aqueous electrolyte lithium ion secondary battery as one preferred embodiment of the present invention.
Figure 2B:
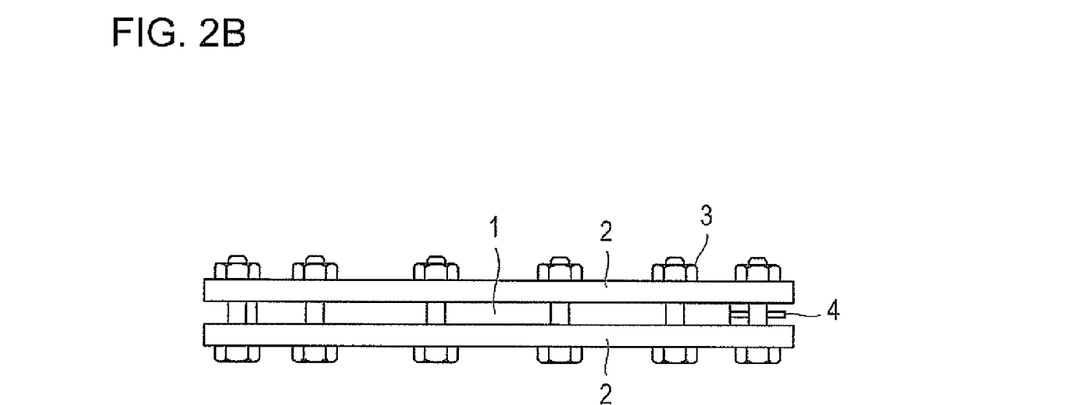
FIG. 2B is a diagram seen from the arrow direction of A in FIG. 2A.

FIG. 2A is a top view of a non-aqueous electrolyte lithium ion secondary battery as one preferred embodiment of the present invention and FIG. 2B is a diagram seen from the arrow direction of A in FIG. 2A. The outer casing with the enclosed power generating element 1 has a flat rectangular shape, and the electrode tab 4 is drawn from the lateral side of the outer casing for extracting electric power. The power generating element is covered by the battery outer casing with its periphery fused by heat. The power generating element is sealed in a state in which the electrode tab is led to the outside. Herein, the power generating element corresponds to the power generating element 21 of the lithium ion secondary battery 10 illustrated in FIG. 1 as described above. In FIGS. 2A and 2B, 2 represents a SUS plate as a pressure member, 3 represents a fixing jig as a fixing member, and 4 represents an electrode tab (negative electrode tab or positive electrode tab). The pressure member is disposed for the purpose of controlling the group pressure applied to power generating element to 0.07 to 0.7 kgf/cm². Examples of the pressure member include a rubber material such as urethane rubber sheet, a metal plate such as aluminum and SUS, a resin material containing polyethylene or polypropylene, and a resin plate such as Bakelite and Teflon (registered trademark). Furthermore, from the viewpoint of having continuous application of constant pressure on a power generating element by a pressure member, it is preferable to have additionally a fixing means for fixing a pressure member. Furthermore, by controlling the fixing of a fixing jig onto a pressure member, the group pressure applied to a power generating element can be easily controlled.

Meanwhile, drawing of the tab illustrated in FIGS. 2A and 2B is not particularly limited, either. The positive electrode tab and the negative electrode tab may be drawn from two lateral sides, or each of the positive electrode tab and negative electrode tab may be divided into plural tabs and drawn from each side, and thus it is not limited to the embodiment illustrated in FIGS. 2A and 2B.

The characteristic feature of this embodiment lies in that Tc/Ta is in the range of 0.6 to 1.3 when Tc is the soak-in time of the electrolyte liquid into the positive electrode active material layer and Ta is the soak-in time of the electrolyte liquid into the negative electrode active material layer. Accordingly, when the liquid absorption (soaking) speed ratio of an electrolyte liquid to the positive and negative electrode active material layers is in an appropriate range when an aqueous binder is used in a negative electrode active material layer, the wettability of the positive and negative electrode active material layers can be improved so that the battery characteristics (long-term cycle characteristics) can be maintained and improved. From this point of view, it is sufficient that Tc/Ta is in the range of 0.6 to 1.3. However, it is preferably in the range of 0.8 to 1.2.

The measurement of soaking time of an electrolyte liquid to the positive electrode active material layer and negative electrode active material layer can be performed according to the following method. Specifically, as for the Tc as soak-in time of the electrolyte liquid into the positive electrode active material layer, 1 μl of propylene carbonate (PC) is added dropwise on center part of the surface of a positive electrode active material layer, and the time at which it is completely absorbed into the active material layer is used (determined by naked eye). For example, the one having the same composition as the electrolyte liquid used for a non-aqueous electrolyte secondary battery can be used. However, as a volatile component is contained, it is difficult to determine whether the electrolyte liquid is removed by evaporation or it is lost from a surface due to soaking into an active material layer. For such reasons, the soak-in time of hardly volatile PC is employed as the soak-in time Tc of an electrolyte liquid into the positive electrode active material layer. Similarly, as for the Ta as soak-in time of the electrolyte liquid into the negative electrode active material layer, the soak-in time of PC is also used.

[Assembled battery] An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle] The electric device has excellent output characteristics and can maintain discharge capacity even when it is used for a long period of time, and thus has good cycle characteristics. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. Thus, the electric device can be preferably used as a power source for a vehicle, for example, as a power source for operating a vehicle or as an auxiliary power source.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinbelow, a description is made in greater detail in view of examples and comparative examples, but the present invention is not limited to the examples given below.

Example 1

1. Preparation of Electrolyte Liquid

A mixed solvent of ethylene carbonate (EC), ethylmethyl carbonate (EMC), and diethyl carbonate (DEC) (volume ratio of 30:30:40) was prepared as a solvent. In addition, 1.0 M $LiPF_6$ was prepared as a lithium salt. In addition, 2% by mass of vinylene carbonate was added to total 100% by mass of the lithium salt and the solvent to prepare an electrolyte liquid. Meanwhile, the expression "1.0 M LiPF$_6$" means that the lithium salt (LiPF$_6$) concentration is 1.0 M in the mixture of the mixture of solvent and lithium salt.

2. Production of Positive Electrode

Solid matter composed of 91% by mass of LiMn$_2$O$_4$ (average particle size: 15 μm) as a positive electrode active material, 5% by mass of acetylene black as a conductive aid, and 4% by mass of PVdF as a binder was prepared. Then, a suitable amount of N-methyl-2-pyrrolidone (NMP) as a solvent for controlling slurry viscosity was added to the solid matter to prepare a slurry of positive electrode active material. Then, the obtained positive electrode slurry was coated on both surfaces of an aluminum foil (thickness: 20 μm) as a current collector followed by drying and press to produce a positive electrode in which the coating amount on a single surface of positive electrode active material layer is 18 mg/cm$^2$ and the thickness on both surfaces is 157 μm (including the foil). The porosity of the positive electrode active material layer was 27%.

3. Production of Negative Electrode

Solid matter composed of 95% by mass of artificial graphite (manufactured by Hitachi Chemical Company, Ltd., shape: scale shape, average particle size: 20 μm) as a negative electrode active material, 2% by mass of acetylene black as a conductive aid, 2% by mass of SBR and 1% by mass of CMC (manufactured by NIPPON PAPER Chemicals CO., LTD., etherification degree of 0.8, weight average molecular weight of 350,000) as a binder was prepared. Then, a suitable amount of ion exchange water as a solvent for controlling slurry viscosity was added to the solid matter to prepare a slurry of negative electrode active material. Then, the obtained negative electrode slurry was coated on both surfaces of a copper foil (thickness: 15 μm) as a current collector followed by drying and press to produce a negative electrode in which the coating amount on a single surface of negative electrode active material layer is 5.1 mg/cm$^2$ and the thickness is 82 μm (including the foil). The porosity of the negative electrode active material layer was 33%. Furthermore, the density of the negative electrode active material layer was 1.46 g/cm$^3$.

4. Process for Producing Single Battery

The positive electrode which has been prepared above was cut to have a rectangular shape of 210×184 mm and the negative electrode was cut to have a rectangular shape of 215×188 mm (15 pieces of positive electrode and 16 pieces of negative electrode). Those positive electrodes and negative electrodes were alternately laminated mediated by a separator of 219×191 mm (polypropylene microporous membrane, thickness of 25 μm, and porosity of 55%) to produce a power generating element.

To each of the positive electrode and negative electrode of the above power generating element, a tab was fused by welding, and by enclosing it with an electrolyte liquid in an outer casing composed of aluminum laminate film, a non-aqueous electrolyte secondary battery (single battery) was completed. The rate capacity of the battery prepared was 14.6 Ah and the ratio of a battery area to the rated capacity was 34.8 cm$^2$/Ah. In addition, the ratio value (L/V$_1$) of the volume L of the electrolyte liquid injected to the outer casing to the volume V$_1$ of pores present in the power generating element was 1.4.

Comparative Example 1

Solid matter composed of 88% by mass of LiMn$_2$O$_4$ (average particle size: 15 μm) as a positive electrode active material, 5% by mass of acetylene black as a conductive aid, and 7% by mass of PVdF as a binder was prepared instead of the preparation of the positive electrode of Example 1. Then, a suitable amount of NMP as a solvent for controlling slurry viscosity was added to the solid matter to prepare a positive electrode slurry. Then, the non-aqueous electrolyte secondary battery (single battery) was completed in the same manner as Example 1 except that the positive electrode slurry was coated on both surfaces of an aluminum foil (thickness: 20 μm) as a current collector followed by drying and press to produce a positive electrode in which the coating amount on a single surface of positive electrode active material layer is 18 mg/cm$^2$ and the thickness on both surfaces is 150 μm (including the foil) (porosity of the positive electrode active material layer was 24%). Herein, the ratio value (L/V$_1$) of the volume L of the electrolyte liquid injected to the outer casing to the volume V$_1$ of pores present in the power generating element of the obtained non-aqueous electrolyte secondary battery (single battery) was 1.4.

Comparative Example 2

Solid matter composed of 95% by mass of artificial graphite (manufactured by Hitachi Chemical Company, Ltd., shape: scale shape, average particle size: 20 μm) as a negative electrode active material, 2% by mass of acetylene black as a conductive aid, 2% by mass of SBR and 1% by mass of CMC (manufactured by NIPPON PAPER Chemicals CO., LTD., etherification degree of 0.8, weight average molecular weight of 350,000) as a binder was prepared instead of the preparation of the negative electrode of Example 1. Then, a suitable amount of ion exchange water as a solvent for controlling slurry viscosity was added to the solid matter to prepare a negative electrode slurry. Then, the non-aqueous electrolyte secondary battery (single battery) was completed in the same manner as Example 1 except that the obtained negative electrode slurry was coated on both surfaces of a copper foil (thickness: 15 μm) as a current collector followed by drying and press to produce a negative electrode in which the coating amount on a single surface of negative electrode active material layer is 5.1 mg/cm$^2$ and the thickness is 83 μm (including the foil) (porosity of the negative electrode active material layer was 31% and density of the negative electrode active material layer was 1.50 g/cm$^3$). Herein, the ratio value (L/V$_1$) of the volume L of the electrolyte liquid injected to the outer casing to the volume V$_1$ of pores present in the power generating element of the obtained non-aqueous electrolyte secondary battery (single battery) was 1.4.

Example 2

Solid matter composed of 60% by mass of LiMn$_2$O$_4$ (average particle size: 15 μm) and 25% by mass of LiNiO$_2$ (average particle size: 15 μm) as a positive electrode active material, 5% by mass of acetylene black as a conductive aid, and 10% by tmass of PVdF as a binder was prepared instead of the preparation of the positive electrode of Example 1. Then, a suitable amount of NMP as a solvent for controlling slurry viscosity was added to the solid matter to prepare a positive electrode slurry. Then, the non-aqueous electrolyte secondary battery (single battery) was completed in the same manner as Example 1 except that the positive electrode slurry was coated on both surfaces of an aluminum foil (thickness: 20 μm) as a current collector followed by drying and press to produce a positive electrode in which the coating amount on a single surface of positive electrode active material layer is 14.6 mg/cm² and the thickness on both surfaces is 127 μm (including the foil) (porosity of the positive electrode active material layer was 25%). Herein, the ratio value ($L/V_1$) of the volume L of the electrolyte liquid injected to the outer casing to the volume $V_1$ of pores present in the power generating element of the obtained non-aqueous electrolyte secondary battery (single battery) was 1.4.

Comparative Example 3

Solid matter composed of 62% by mass of $LiMn_2O_4$ (average particle size: 15 μm) and 26% by mass of $LiNiO_2$ (average particle size: 15 μm) as a positive electrode active material, 5% by mass of acetylene black as a conductive aid, and 7% by mass of PVdF as a binder was prepared instead of the preparation of the positive electrode of Example 1. Then, a suitable amount of NMP as a solvent for controlling slurry viscosity was added to the solid matter to prepare a positive electrode slurry. Then, the non-aqueous electrolyte secondary battery (single battery) was completed in the same manner as Example 1 except that the positive electrode slurry was coated on both surfaces of an aluminum foil (thickness: 20 μm) as a current collector followed by drying and press to produce a positive electrode in which the coating amount on a single surface of positive electrode active material layer is 14.6 mg/cm² and the thickness on both surfaces is 127 μm (including the foil) (porosity of the positive electrode active material layer was 26%). Herein, the ratio value ($L/V_1$) of the volume L of the electrolyte liquid injected to the outer casing to the volume $V_1$ of pores present in the power generating element of the obtained non-aqueous electrolyte secondary battery (single battery) was 1.4.

Example 3

Solid matter composed of 91% by mass of $LiMn_2O_4$ (average particle size: 10 μm) as a positive electrode active material, 5% by mass of acetylene black as a conductive aid, and 4% by mass of PVdF as a binder was prepared instead of the preparation of the positive electrode of Example 1. Then, a suitable amount of NMP as a solvent for controlling slurry viscosity was added to the solid matter to prepare a positive electrode slurry. Then, the non-aqueous electrolyte secondary battery (single battery) was completed in the same manner as Example 1 except that the positive electrode slurry was coated on both surfaces of an aluminum foil (thickness: 20 μm) as a current collector followed by drying and press to produce a positive electrode in which the coating amount on a single surface of positive electrode active material layer is 18 mg/cm² and the thickness on both surfaces is 160 μm (including the foil) (porosity of the positive electrode active material layer was 27%). Herein, the ratio value ($L/V_1$) of the volume L of the electrolyte liquid injected to the outer casing to the volume $V_1$ of pores present in the power generating element of the obtained non-aqueous electrolyte secondary battery (single battery) was 1.4.

Comparative Example 4

Solid matter composed of 95% by mass of artificial graphite (manufactured by Hitachi Chemical Company, Ltd., shape: scale shape, average particle size: 20 μm) as a negative electrode active material, 2% by mass of acetylene black as a conductive aid, 2% by mass of SBR and 1% by mass of CMC (manufactured by NIPPON PAPER Chemicals CO., LTD., etherification degree of 0.8, weight average molecular weight of 350,000) as a binder was prepared instead of the preparation of the negative electrode of Example 3 (=Example 1). Then, a suitable amount of ion exchange water as a solvent for controlling slurry viscosity was added to the solid matter to prepare a negative electrode slurry. Then, the non-aqueous electrolyte secondary battery (single battery) was completed in the same manner as Example 3 except that the obtained negative electrode slurry was coated on both surfaces of a copper foil (thickness: 15 μm) as a current collector followed by drying and press to produce a negative electrode in which the coating amount on a single surface of negative electrode active material layer is 5.1 mg/cm² and the thickness is 78 μm (including the foil) (porosity of the negative electrode active material layer was 25% and density of the negative electrode active material layer was 1.63 g/cm³). Herein, the ratio value ($L/V_1$) of the volume L of the electrolyte liquid injected to the outer casing to the volume $V_1$ of pores present in the power generating element of the obtained non-aqueous electrolyte secondary battery (single battery) was 1.4.

Example 4

In Example 4, the non-aqueous electrolyte secondary battery (single battery) was completed in the same manner as Example 3 except that the same positive electrode and negative electrode as those of Example 3 were used and the amount of an electrolyte liquid was changed to have $L/V_1$ of 1.15.

(Evaluation of Battery)

1. Process for Initial Charge and Discharge of Single Battery

The non-aqueous electrolyte secondary battery (single battery) produced as above was evaluated according to a charge and discharge performance test. For the charge and discharge performance test, the battery was kept for 24 hours in an incubator at 25° C. for performing initial charge. For the initial charge, constant current charge (CC) was performed at current value of 0.05 CA until 4.2 V followed by constant voltage (CV), thus it was charged for 25 hours in total. After that, it was kept for 96 hours in an incubator at 40° C. After that, it was discharged to 2.5 V at current rate of 1 C in an incubator at 25° C., followed by resting time for 10 minutes.

2. Evaluation of Battery

Subsequently, the performance test was performed after having the battery temperature of 45° C. by using an incubator kept at 45° C. For the charge, constant current charge (CC) was performed at current value of 1 C until 4.2 V followed by constant voltage (CV), thus it was charged for 2.5 hours in total. Then, after having resting time for 10 minutes, it was discharged to 2.5 V at current rate of 1 C followed by resting time for 10 minutes. The charge and discharge test was performed by having them as one cycle. The ratio of discharge capacity at $300^{th}$ cycle to the initial discharge capacity was used as retention rate (%). Namely, it is expressed as follows: Retention rate after 300 cycles (%)=Discharge capacity at $300^{th}$ cycle/Initial discharge cycle ($1^{st}$ cycle)×100. The results are shown in the following Table 1 to 3.

3. Measurement of Soak-in Time

Measurement of soak-in time into a positive electrode active material layer and a negative electrode active material layer was measured according to the following method. Specifically, as for the Tc as soak-in time of the electrolyte liquid into the positive electrode active material layer, 1 μl of propylene carbonate (hereinbelow, also simply referred to as the "PC") is added dropwise on center part of a positive electrode active material layer, and the time at which it is completely absorbed into the active material layer is used (determined by naked eye). For example, the one having the same composition as the electrolyte liquid used for the above battery can be used. However, as a volatile component is contained, it is difficult to determine whether the electrolyte liquid is removed by evaporation or it is lost from a surface due to soaking into an active material layer. For such reasons, the soak-in time of hardly volatile PC is employed as the soak-in time Tc of an electrolyte liquid into the positive electrode active material layer. Similarly, as for the Ta as soak-in time of the electrolyte liquid into the negative electrode active material layer, the soak-in time of PC is also used. According to the method described above, each of the soak-in time Tc, Ta was measured by using the positive electrodes and negative electrodes which have been produced in Examples 1 to 4 and Comparative Examples 1 to 4. The obtained results are shown in Table 1 to 3.

TABLE 1

|  | Soak-in time into positive electrode (Tc) [second] | Soak-in time into negative electrode (Ta) [second] | Tc/Ta | L/V$_1$ | Retention rate after 300 cyc | Retention rate after 500 cyc |
| --- | --- | --- | --- | --- | --- | --- |
| Example 1 | 97 | 130 | 0.75 | 1.40 | 83% | 75% |
| Comparative Example 1 | 200 | 130 | 1.54 | 1.40 | 75% | 60% |
| Comparative Example 2 | 97 | 190 | 0.51 | 1.40 | 75% | 60% |

TABLE 2

|  | Soak-in time into positive electrode (Tc) [second] | Soak-in time into negative electrode (Ta) [second] | Tc/Ta | L/V$_1$ | Retention rate after 300 cyc | Retention rate after 500 cyc |
| --- | --- | --- | --- | --- | --- | --- |
| Example 2 | 100 | 130 | 0.77 | 1.40 | 92% | 85% |
| Comparative Example 3 | 210 | 130 | 1.62 | 1.40 | 88% | 75% |

TABLE 3

|  | Soak-in time into positive electrode (Tc) [second] | Soak-in time into negative electrode (Ta) [second] | Tc/Ta | L/V$_1$ | Retention rate after 300 cyc | Retention rate after 500 cyc |
| --- | --- | --- | --- | --- | --- | --- |
| Example 3 | 90 | 122 | 0.74 | 1.40 | 82% | 73% |
| Comparative Example 4 | 90 | 160 | 0.56 | 1.40 | 80% | 58% |

TABLE 3-continued

|  | Soak-in time into positive electrode (Tc) [second] | Soak-in time into negative electrode (Ta) [second] | Tc/Ta | L/V$_1$ | Retention rate after 300 cyc | Retention rate after 500 cyc |
| --- | --- | --- | --- | --- | --- | --- |
| Comparative Example 4 | Same as Example 3 | Same as Example 3 | Same as Example 3 | 1.15 | 81% | 60% |

The difference in positive electrode active material layer between Example 1 and Comparative 1 is that the binder amount is different, that is, Example 1 has a binder amount of 10% by mass while Comparative Example 1 has a binder amount of 7% by mass. Due to the difference in this binder amount, the soak-in time of the electrolyte liquid into the positive electrode active material layer in Example 1, that is, Tc, is shortened as shown in Table 1. Meanwhile, the negative electrode active material layers of Example 1 and Comparative Example 2 have the same single surface coating amount but they are different in terms of negative electrode thickness. Since the negative electrode of Example 1 has higher thickness, it has lower density of the negative electrode active material layer. Thus, as shown in Table 1, the soak-in time of the electrolyte liquid into the negative electrode active material layer in Example 1, that is, Ta, is shortened.

When Example 1, Comparative Example 1, and Comparative Example 2 are compared to one another, it was found that Example 1 in which the ratio of Tc and Ta (Tc/Ta) representing the soak-in time of the electrolyte into the positive electrode and negative electrode active material layers was in the range of 0.6 to 1.3 exhibited the highest retention rate after 300 cycles. Furthermore, even for the retention rate after 500 cycles, it was confirmed that Example 1 could maintain significantly higher retention rate than Comparative Examples 1 and 2.

In Example 2, a Mn-based active material and a Ni-based active material were mixed and used for a positive electrode active material. The positive electrode of Example 2 and Comparative Examples 3 has the same ratio of a Mn-based active material and a Ni-based active material, but the binder amount is different. In Example 2, the binder amount in the positive electrode active material layer is 10% by mass but, in Comparative Example 3, the binder amount in the positive electrode active material layer is 7% by mass. Due to this difference in the binder amount, Tc representing the soak-in time of the electrolyte liquid into the positive electrode active material layer in Example 2 was shortened, as described in Table 2.

When Example 2 and Comparative Example 3 are compared to each other, it was found that Example 2 in which the ratio of Tc and Ta (Tc/Ta) representing the soak-in time of the electrolyte into the positive electrode and negative electrode active material layers was in the range of 0.6 to 1.3 exhibited the higher retention rate after 300 cycles. Furthermore, even for the retention rate after 500 cycles, it was confirmed that Example 2 could maintain significantly higher retention rate than Comparative Example 3.

Example 3 has the same compositional ratio of a positive electrode active material, a binder, and a conductive aid as Example 1, but it is different in terms of the type of a positive electrode active material. Namely, the Mn-based active material is the same, but the average particle size (specific surface area) is different. As the average particle size in Example 1 is larger than Example 3, Ta representing the soak-in time of the electrolyte liquid into the positive electrode active material layer in Example 1 is shortened compared to Example 3, as shown in Table 1 and 3. Example 1, Example 3, and Comparative Example 4 are different from one another in terms of the electrode density of a negative electrode. Namely, the negative electrode active material layer of Example 3 has lower density than that of Example 1 or Comparative Example 4, and thus Ta representing the soak-in time of the electrolyte liquid into the negative electrode active material layer was shortened in Example 3 as shown in Table 1 and 3.

When Example 1 and Example 3 are compared to each other, it was found that the ratio of Tc and Ta (Tc/Ta) representing the soak-in time of the electrolyte into the positive electrode and negative electrode active material layers was in the range of 0.6 to 1.3 for both, but Example 1 in which the ratio of Tc and Ta (Tc/Ta) representing the soak-in time of the electrolyte into the positive electrode and negative electrode active material layers was closer to 1 exhibited increased retention rate after 300 cycles. Furthermore, even for the retention rate after 500 cycles, it was confirmed that Example 1 could maintain higher retention rate than Example 3.

Furthermore, when Example 3 and Comparative Example 4 are compared to each other, it was found that Example 3 in which the ratio of Tc and Ta (Tc/Ta) representing the soak-in time of the electrolyte into the positive electrode and negative electrode active material layers was in the range of 0.6 to 1.3 exhibited the higher retention rate after 300 cycles. Furthermore, even for the retention rate after 500 cycles, it was confirmed that Example 2 could maintain significantly higher retention rate than Comparative Example 3.

As for Example 4, it exhibited almost the same performance as Example 3 until $300^{th}$ cycle. However, after $500^{th}$ cycle, it could confirm that there was a huge difference in the performance. In this regard, it was believed that, due to a side reaction caused by charge and discharge cycle, the electrolyte liquid was solidified to deplete the electrolyte in liquid state, and as a result, the retention rate started to get deteriorated in the middle of the cycle.

The invention claimed is:

1. A non-aqueous electrolyte secondary battery having a power generating element enclosed within an outer casing, wherein
    the power generating element has a positive electrode obtained by forming a positive electrode active material layer on a surface of a positive electrode current collector, a negative electrode obtained by forming a negative electrode active material layer comprising an aqueous binder on a surface of a negative electrode current collector, and a separator for maintaining an electrolyte liquid,
    Tc/Ta is in a range of 0.6 to less than 1.0 when Tc is a soak-in time of the electrolyte liquid into the positive electrode active material layer and Ta is a soak-in time of the electrolyte liquid into the negative electrode active material layer, and
    a porosity of the positive electrode active material layer is in a range of 20 to 30% and a porosity of the negative electrode active material layer is in a range of 25 to 40%, and
    a ratio value of a battery area ($cm^2$/Ah), defined as a projected area of a battery including an outer casing of the battery to a rated capacity, is 5 $cm^2$/Ah or more and the rated capacity is 3 Ah or more.

2. The non-aqueous electrolyte secondary battery according to claim 1, wherein the aqueous binder comprises at least one rubber-based binder selected from the group consisting of styrene-butadiene rubber, acrylonitrile-butadiene rubber, methyl methacrylate-butadiene rubber, and methyl methacrylate rubber.

3. The non-aqueous electrolyte secondary battery according to claim 2, wherein the aqueous binder comprises styrene-butadiene rubber.

4. The non-aqueous electrolyte secondary battery according to claim 1, wherein a binder content in the positive electrode active material layer is in a range of 2 to 6% by weight.

5. The non-aqueous electrolyte secondary battery according to claim 1, wherein the aqueous binder content in the negative electrode active material layer is 2 to 5% by weight.

6. The non-aqueous electrolyte secondary battery according to claim 1, wherein a ratio value ($L/V_1$) of a volume L of the electrolyte liquid injected to the outer casing to a volume $V_1$ of pores present in the power generating element is in a range of 1.2 to 1.6.

7. The lithium ion secondary battery according to claim 1, wherein the power generating element has a laminate structure and the outer casing is a laminate film comprising aluminum.

8. The non-aqueous electrolyte secondary battery according to claim 1, wherein the negative electrode active material layer has a rectangular shape and a short side length of the rectangular shape is 100 mm or more.

9. The non-aqueous electrolyte secondary battery according to claim 1, wherein an aspect ratio of an electrode which is defined by a horizontal to vertical ratio of the positive electrode active material layer with a rectangular shape is 1 to 3.

10. A non-aqueous electrolyte secondary battery having a power generating element enclosed within an outer casing, wherein
    the power generating element has a positive electrode obtained by forming a positive electrode active material layer on a surface of a positive electrode current collector, a negative electrode obtained by forming a negative electrode active material layer comprising an aqueous binder on a surface of a negative electrode current collector, and a separator for maintaining an electrolyte liquid,
    Tc/Ta is in a range of 0.6 to 1.3 when Tc is a soak-in time of the electrolyte liquid into the positive electrode active material layer and Ta is a soak-in time of the electrolyte liquid into the negative electrode active material layer and Tc and Ta are different soak-in times, and
    a porosity of the positive electrode active material layer is in a range of 20 to 28% and a porosity of the negative electrode active material layer is in a range of 25 to 40%, and
    a ratio value of a battery area ($cm^2$/Ah), defined as a projected area of a battery including an outer casing of the battery to a rated capacity, is 5 $cm^2$/Ah or more and the rated capacity is 3 Ah or more.

* * * * *